July 4, 1939.   A. R. LONG   2,164,414
AIRCRAFT
Filed Jan. 22, 1936   2 Sheets-Sheet 1
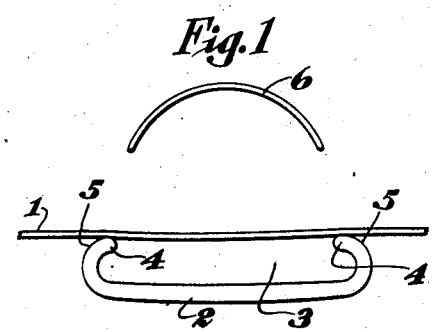
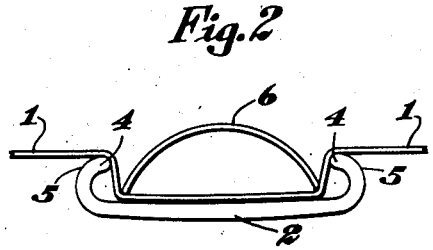
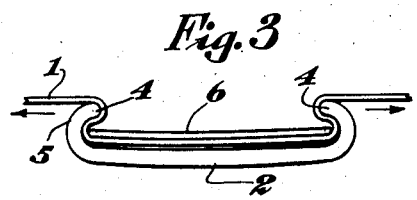
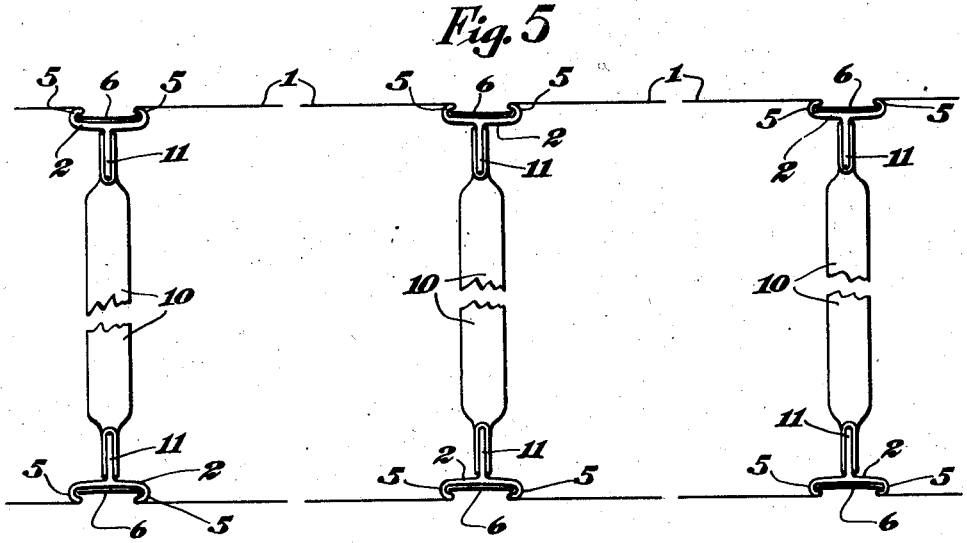
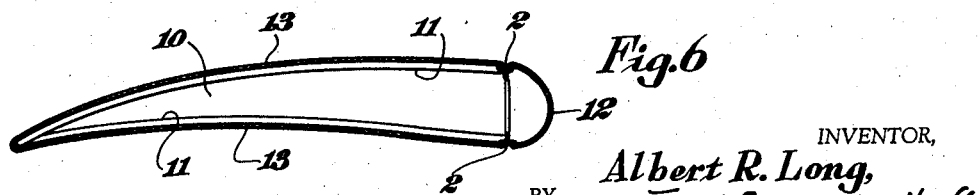
INVENTOR,
Albert R. Long,
BY
ATTORNEYS July 4, 1939.                A. R. LONG                2,164,414
                              AIRCRAFT
                       Filed Jan. 22, 1936        2 Sheets-Sheet 2
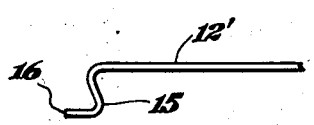
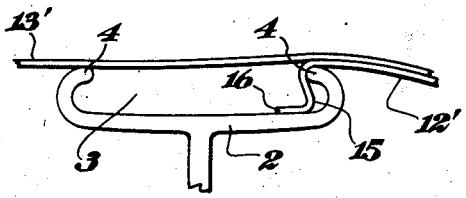
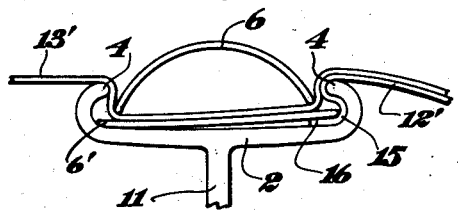
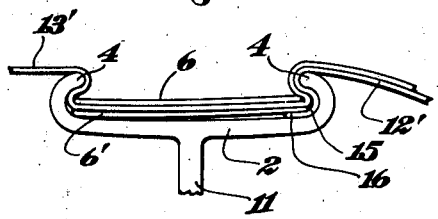
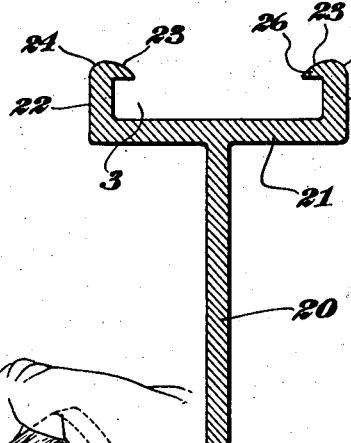
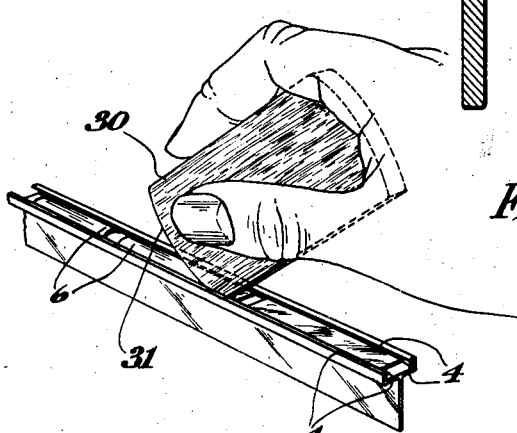
INVENTOR,
Albert R. Long,
BY
ATTORNEYS Patented July 4, 1939

2,164,414

UNITED STATES PATENT OFFICE 2,164,414

AIRCRAFT

Albert Regan Long, Elmhurst, N. Y.

Application January 22, 1936, Serial No. 60,207

5 Claims. (Cl. 244—132)

This invention relates to the attachment of the covering to wings, fuselages, nacelles, control surfaces, pontoons, boats and other elements of aircraft and the attachment of inflatable rubberlike devices to aeroplane wings for preventing the formation of ice, and similar applications.

The covering for aircraft elements, such as the conventional fabric and metallic skins, is in conventional practice attached by the conventional sewing, rivetting and welding practices which are not entirely satisfactory, because of the discontinuous nature of the attachment, roughness at joint, the high cost of assembly and the difficulty and expense in making repairs and replacements.

These objections are obviated by the present invention, according to which the cover or covers are attached firmly and securely, whether fabric or metal, along continuous uninterrupted lines to the framework and in a simple and easy manner, requiring no particular skill and, moreover, in a manner which enables the cover or other device to be quickly repaired or to be quickly removed and replaced. Moreover, as applied to aircraft, the only change from the conventional structure is the formation of slightly modified attaching frame members which may be economically manufactured and assembled without additional costs.

Other objects of the invention will hereinafter appear.

For a better understanding of the invention reference may be had to the accompanying drawings forming a part of this application wherein:

Figs. 1 to 4 are diagrammatic views illustrating the principle of the invention;

Fig. 5 is a diagrammatic sectional view showing the application of the invention to an aerofoil surface;

Fig. 6 is a diagrammatic sectional view showing the application of the invention to an aeroplane wing;

Figs. 7 to 10 are diagrammatic views illustrating specific covers and devices generally shown in Fig. 6;

Fig. 11 is a sectional view of a specific cap strip or frame member to which the covering or skin may be attached; and Fig. 12 is a perspective view showing one method of flattening out the fastening keys or anchor strips.

Referring to Figs. 1 to 3 of the drawings, the thin flexible sheet to be attached to a frame member is indicated at 1. The frame member to which the sheet is to be attached or for attaching sheets or the edges of sheets together comprises a base 2 which has formed therein a locking groove 3 extending lengthwise thereof. In the particular embodiment shown this groove is formed by the side flanges 5 turned at an angle to the base 2 and then turned inwardly towards each other to form inturned locking shoulders 4 remote from the base 2, so that the outer part of the groove 3 is narrower than the inner part. The thin flexible sheet 1 is detachably locked into the groove 3 by means of a special key or anchor strip 6 which is co-extensive in length with the groove 3, in one piece or divided into sections. This key 6 is arch shaped in cross section as shown in Figs. 1 and 2 and the width of the arch is slightly less than the opening leading into the groove 3 past the shoulders 4. The key 6 is formed of a material which permits it to be readily flattened out, such for example as of soft aluminum or other metals or alloys. The step of assembling the key is illustrated in Fig. 2, wherein it is observed that the key 6 is placed down into the groove 3 with the concave side toward the base 2 and in engagement with the flexible sheet 1, the latter being pushed into the groove and into engagement with the base 2 of the frame member, as indicated. The key or anchoring strip 6 is then flattened out in any suitable manner to occupy the position shown in Fig. 3, the side edges thereof projecting underneath the locking shoulders 4, and causing the sheet 1 to pass around these edges and then inwardly around the locking shoulders 4, whereupon the thin sheet 1 is firmly anchored and locked to the member 2. It is locked against pull or tension on the sheet in any direction and particularly in the direction parallel to the flattened key member 6, as for example as illustrated by the arrows in Fig. 3. The flattening of the key element 6 may be accomplished in any suitable manner, as for example by the use of a convenient tool, preferably having a flat bearing surface, which is inserted into the groove 3 and caused to engage and traverse the length of the key. The key or anchor strip 6 which is made of upsettable material holds its flat form when thus flattened out and is preferably sufficiently soft and yieldable so as to enable the flattening of the same by manual pressure upon a suitable tool. The fabric may be readily released from the frame member by inserting an instrument underneath the key 6 and reupsetting and prying it out of the groove.

In Fig. 4 is illustrated the attachment of two flexible sheets to each other in a continuous manner, along their edges. The two sheets thus fastened together are indicated at 7 and 8 and at the same time these sheets are firmly fastened in the detachable manner described to the member 2.

Fig. 5 shows the application of the invention to an aerofoil surface used in aircraft. The aerofoil ribs which give form to the surface are provided with cap strips having flanges 11 and outer or supporting parts or bases 2 formed as indicated in Figs. 1 to 3. These cap strips are adapted to receive the arch shaped key members 6, which are flattened out as described above to lock and fasten the aerofoil covering 1 which may be the conventional cloth aeroplane covering material, into the curved cap strips 11 to form a continuous line or double line of attachment throughout the width of the aerofoil and, moreover, in a deachable manner as above described. The ribs 10 may be of any conventional structure other than the special cap strip structure above described. For example, two or more of the ribs 10 may be of any conventional watertight construction to form watertight compartments for aeroplane wings and this watertight character or seal is facilitated by the particular method of fastening the cover in the continuous manner shown.

Fig. 6 shows the application of the invention to an aerofoil, such for example as a lifting wing of an aeroplane, wherein the nose of the wing is covered by devices or covers of a different character or material from that of the covering of the rest of the wing. In this construction there is provided a pair of the special attaching members 2 extending lengthwise of the wing and adjacent the nose of the wing and fastened to the ribs 10. The special covering or device for the nose is indicated at 12 and is attached tightly and firmly thereto by having its edges locked into the special members 2 by keys 6. This special nose covering may be a rubber boot to prevent the formation of ice on the wing or it may be of metallic skin. The remainder of the wing is covered by a suitable covering 13 which is detachably fastened to transverse ribs 10 similarly to the manner shown in Fig. 5.

Where the special nose covering is metal and the remainder of the wing covering is of the conventional cloth or fabric, I have shown in Figs. 7 to 10 inclusive the preferred method of fastening and anchoring the covers. The metallic strip 12' is cut to the desired width to reach from the upper member 2 to the lower member 2 when bent around the nose frame structure. Each edge of this strip is then formed with a bead or the like 15 which is inserted into the groove 3 in engagement with the nearest shoulder 4 of the groove, the edge 16 of the bead being bent to engage the base 2 of the attaching member. The beads 15 formed in the opposite edges of the sheet are forced past the shoulders 4 when the sheet is assembled in position and the offset of the beads is just sufficient to retain the sheet in the assembled position while assembling the key or anchor strip 6 and the cover 13'. When the key member 6 is then inserted and flattened out, as shown in Figs. 9 and 10 respectively, the edge of the key forces the bead 15 into the extremity of the groove, further upsetting the bead and forming a firm and secure lock. In the particular embodiment shown in Figs. 8 to 10 a fabric 13' of conventional aeroplane cloth covering is also inserted around the nose, since it is more convenient in this case to have the covering 13' extend uninterruptedly from the upper to the lower surface of the aeroplane. Fig. 8 illustrates the assembly of the metallic sheet with a bead 15 in engagement with the shoulder 4 and the covering 13' placed thereover. Fig. 9 shows the key 6 dropped into the groove and the cloth 13' forced toward the base of the groove. Fig. 10 shows the key flattened out to firmly lock both the cloth 13 and the metallic skin 12 firmly in position. I have shown in Figs. 9 and 10 two keys within the groove, one key 6' underneath locking the metal and another key 6 above locking the cloth. The key 6' for the metal covering should be of harder material than the key 6, as for example of heat treated aluminum alloy. The keys 6 for the cloth may be and preferably are of soft aluminum.

The shape and size of the groove 3 may vary to suit different requirements but the general relative proportions shown give good results for conventional aeroplane coverings.

Fig. 11 shows the preferred form of cap strip in cross section. The cap strip here shown is of standard T section having the vertical 20 for fastening to the rib and the cross piece 21. The latter has its ends turned at right angles to form the end parts 22 of the locking groove and these parts 22 in turn have their ends 23 turned inwardly in parallel relation with the cross 21. The surfaces of the groove are all plane surfaces disposed at right angles to each other. The inwardly turned parts 23 are bevelled on their outer surfaces to have curvatures at the heels 24 of approximately $30/1000$ of an inch radius. This curved surface at the heel gradually merges into an arched surface inwardly toward the plane of the vertical 20 which has a radius of approximately $70/1000$ of an inch and this curvature is continued around to the points 26. I have found that with curvatures of this character forming the bearing surface for textile fabric coverings for aeroplanes, the covering will not rupture under stress at the point of engagement with the anchoring member, but always on a line removed therefrom and in some cases the rupturing line is approximately midway between the two lines of fastening. The placing of another layer of covering underneath the cover at the bearing surfaces 23 in some cases causes the rupturing line of the fabric to be shifted further away from the cap strip. The groove itself is deep enough to receive two of the keys 6 and a double layer of cloth and, accordingly, an aeroplane cloth covered wing may be very quickly and simply repaired by placing over the defective part a second sheet which is fastened to the cap strip by a second line of flattened out keys 6.

The dimensions of the cap strip shown in Fig. 11 and other figures may be proportioned to suit the particular requirements. For the conventional covering of aeroplane wings, the groove 3 in Fig. 11 may be approximately $4/10$ of an inch long and $80/1000$ of an inch deep, with the thickness of the parts 21 and 22 roughly $45/1000$ of an inch.

The key 6 may be of any desired, convenient and practicable length. I have found that keys of shorter length are handled and manipulated more easily than long keys. I have shown such shorter keys in Fig. 12 which are approximately two inches long in practice, but preferably these keys abut against each other to form a continuous fastening line. I have also shown in Fig. 12 a suitable flattening tool 30 of hard wood which has a rounded or cylindrical edge 31 for engaging and flattening the keys 6 and is of a thickness to freely enter the opening between the shoulders 4 of the groove.

When applying metallic skins to the aircraft wing or aerofoil, the skin is cut in sheets of the desired widths, as for example just wide enough to bridge two adjacent cap strips, and then beads are formed as described above in Fig. 7 for assembly upon the cap strips before the locking by assembling and flattening out the keys. When applying wing fabric coverings the latter may be put on in larger sheets, that is, the sheets may bridge any part of the cap strips desired and the tension of the sheets may be regulated as desired as the sheets are fastened in position.

It is understood that while I have illustrated my invention as applied specifically to the aircraft art, it is understood that the principle is of wider application.

As above described, the keys 6 are made of soft thin readily upsettable metal or metal alloys and wherever that term is used in the claims it is understood to mean a key which can be flattened out by the application of hand pressure as shown in Fig. 12 and without hammering and which can be as readily upset and removed from the cap strip by the manual insertion of a suitable instrument underneath a flattened key. By the term thin flexible sheet or covering as used in the claims I mean a covering of the character used on conventional aerofoils.

I claim:

1. In an aerofoil for aircraft, a supporting frame having cap strips with open undercut grooves formed thereon and a thin flexible sheet-like covering bound about said frame under tension, said grooves containing loops of the covering therein and thin flat locking keys, said covering being firmly fastened to said cap strip by said thin flat keys disposed in said grooves and locked therein in flat engagement with said loops formed from the covering, said keys being of a soft readily upsettable metal and having little resistance to upsetting operations locally applied transversely of the surface thereof and which may be upset and removed from said grooves by the hand application of a tool underneath the same, but firmly resisting and holding fast against tensile stress exerted on the covering and each groove containing a multiplicity of short, juxtaposed, flat, upsettable keys engaging the loop of the cover and locking the same therein.

2. In an aerofoil for aircraft, a supporting frame having cap strips with open undercut grooves formed thereon and a thin flexible sheet-like fabric covering bound about said frame under tension, said grooves containing loops of the covering therein and thin flat locking keys, said covering being firmly fastened to said cap strips by said thin flat keys disposed in said grooves and locked therein in flat engagement with said loops formed from the covering, said keys being of a soft readily upsettable metal and having little resistance to upsetting operations locally applied transversely of the surface thereof and which may be upset and removed from said grooves by the hand application of a tool underneath the same, but firmly resisting and holding fast against tensile stress exerted on the covering, and which may be upset and removed from said grooves by the hand application of a tool underneath the same.

3. In an aerofoil for aircraft, a supporting frame having cap strips with open undercut grooves formed thereon and a thin flexible sheet-like covering bound about said frame under tension, said grooves containing loops of the covering therein and thin flat locking keys, said covering being firmly fastened to said cap strips by said thin flat keys disposed in said grooves and locked therein in flat engagement with said loops formed from the covering, said keys being of a soft readily upsettable aluminum and having little resistance to upsetting operations locally applied transversely of the surface thereof and which may be upset and removed from said grooves by the hand application of a tool underneath the same, but firmly resisting and holding fast against tensile stress exerted on the covering.

4. In an aerofoil for aircraft, a supporting frame having cap strips with open undercut grooves formed thereon and a thin flexible sheet-like covering bound about said frame under tension, said grooves containing loops of the covering therein and thin flat locking keys, said covering being firmly fastened to said cap strips by said thin flat keys disposed in said grooves and locked therein in flat engagement with said loops formed from the covering, said keys being of a soft readily upsettable aluminum alloy and having little resistance to upsetting operations locally applied transversely of the surface thereof and which may be upset and removed from said grooves by the hand application of a tool underneath the same, but firmly resisting and holding fast against tensile stress exerted on the covering.

5. In an aerofoil for aircraft, a supporting frame having cap strips with open undercut grooves formed thereon and a thin flexible sheet-like fabric covering bound about said frame under tension, said grooves containing loops of the covering therein and thin flat locking keys, said covering being firmly fastened to said cap strips by said thin flat keys disposed in said grooves and locked therein in flat engagement on the bottom and edges thereof with said loops, said keys being of less thickness than the depth of the grooves and of a soft readily upsettable metal and having little resistance to upsetting operations locally applied transversely of the surface thereof and which may be upset and removed from said grooves by the hand application of a tool underneath the same, but firmly resisting and holding fast against tensile stress exerted on the covering.

ALBERT R. LONG.

CERTIFICATE OF CORRECTION.

Patent No. 2,164,414. July 4, 1939.

ALBERT REGAN LONG.

It is hereby certified that error appears in the printed specification of the above numbered patent requiring correction as follows: Page 3, second column, lines 6 to 8 inclusive, strike out the words "and which may be upset and removed from said grooves by the hand application of a tool underneath the same" and insert instead said grooves being formed of plane surfaces disposed at right angles to each other; and that the said Letters Patent should be read with this correction therein that the same may conform to the record of the case in the Patent Office.

Signed and sealed this 22nd day of August, A. D. 1939.

Leslie Frazer (Seal)   Acting Commissioner of Patents.